Patented Feb. 16, 1937

2,071,214

UNITED STATES PATENT OFFICE 2,071,214

PROCESS FOR THE MANUFACTURE OF RUBBER COMPOSITIONS FROM LATEX AND LIKE AQUEOUS RUBBER DISPERSIONS

Ugo Pestalozza, Milan, Italy, assignor to Societa Italiana Pirelli, Milan, Italy No Drawing. Application October 26, 1934, Serial No. 750,206. In Great Britain October 30, 1933

12 Claims. (Cl. 106—23)

This invention relates to the direct manufacture from latex and the like aqueous dispersions of substantially dry rubber compositions and goods compounded with a hardening and toughening ingredient.

Several proposals have already been made for the production of such rubber compositions and goods involving the formation of the compounding ingredient or ingredients in situ in the mass. Such proposals, however, have usually necessitated the addition of soluble substances—generally two salts which react by double exchange to produce two other salts one at least of which is insoluble, whereas it is generally desirable in connection with rubber latex processes to eliminate as far as possible the use of water soluble reagents, and particularly to avoid the formation of relatively large amounts of soluble reaction products.

According to the present invention, a process for the direct manufacture from aqueous rubber dispersions of rubber compositions and goods compounded with magnesium hydroxide as a hardening and toughening ingredient, consists in producing the magnesium hydroxide in situ in the mass by hydration with the water of the dispersion of magnesium oxide introduced into the initial dispersion in sufficient quantity for this purpose and in such amount having regard to the conditions of coagulation of the dispersion that the process of hydroxide formation is caused to continue for a substantial period after coagulation of the dispersion is complete, depending upon the degree of hardness required of the ultimate product.

Particularly satisfactory results have been obtained in the process with magnesium oxides of the heavy and light types produced respectively by calcination of magnesite and calcination of basic magnesium carbonate or magnesium hydroxide.

As already indicated herein, it is essential that at least part of the process of hydration of the added oxide shall take place after coagulation of the dispersion has set in; in other words, it is essential that the formation of the hydroxide shall take place partly at least in the mass of coagulated rubber; and the conditions of the process should be controlled accordingly.

The invention contemplates the use of aqueous dispersions of natural rubber, for example, rubber latex, concentrated or unconcentrated, and preserved, for instance with ammonia, or unpreserved, aqueous dispersions, concentrated or unconcentrated, of artificial rubber, aqueous dispersions of balata, gutta percha and the like, and mixtures of any two or more of these; and the term "rubber" is to be understood as employed herein in this broad generic sense.

By means of the process of the present invention, it is readily possible (that is to say, after coagulation of the dispersion and vulcanization and drying of the coagulum) to obtain rubber products having for a given content of magnesium hydroxide a very high degree of hardness and toughness, as compared with known compositions of the same general class.

The magnesium oxide should preferably be introduced in the form of an aqueous suspension, which must be added soon after its preparation, in order to avoid premature hydration of the suspended oxide. Thus, it may be found that the direct addition of large quantities of magnesium oxide particularly if the dispersion be a concentrated dispersion, tends to promote coagulation of the dispersion in the form of a flocculate, which of course is to be avoided and may be avoided, with enhanced control of the coagulation reaction as a whole, by introducing the magnesium oxide or in suspension in an aqueous solution or dispersion of a dispersing agent. Suitable dispersing agents for this purpose are alkali metal salts of sulphonated fatty acids. Thus, the oxide may be introduced into the dispersion in suspension in a 1.5-2% aqueous solution of sodium cetyl-sulphonate, in the ratio of oxide to solution of from 1:2 to 1:7, depending upon the voluminousness in suspension of the oxide.

Upon the addition of the aqueous suspension of magnesium oxide or the like to the rubber dispersion, coagulation of the latter sets in during a period which may vary from a few minutes to a few hours, according to whether the dispersion contains other coagulating media or not, and depending also upon the quantity of magnesium oxide or the like introduced into the dispersion, the quantity of dispersion agent present and the concentration of the dispersion. The process of hydration of the magnesium oxide, however, which is usually rather slow, may begin in the dispersion while the latter is still fluid but must not terminate until after coagulation of the dispersion has fully taken place. Indeed, as already indicated herein, it is essential that this should be the case, that is to say, that a part at least of the process of hydration of the oxide shall take place after coagulation has set in. It will generally be found that the time required for complete hydration of the added magnesium oxide will be of the order of 10–12 hours, if the ammoniated dispersion is left to stand at room temperature.

By raising the temperature of the dispersion, however, both coagulation and hydration of the oxide may be very considerably accelerated. For example, at a temperature of about 60° C., a concentrated latex dispersion, upon the addition of the magnesium oxide, will coagulate in a few minutes and the hydration of the oxide will be complete in two hours or less.

It is generally found that where a soluble coagulating agent is not added to the rubber dispersion, or where substances are not added which, reacting with the added magnesium oxide, give rise to the formation in situ in the dispersion of a soluble coagulant, the coagulum which forms from the dispersion assumes a condition of stiffness but possesses rather a lower order of resistance to fracture and the final product only increases in tenacity upon drying.

It is preferred, therefore, to have present in the dispersion during the coagulating process, a soluble coagulant, for example a soluble salt of zinc such as zinc acetate or zinc sulphate, added in aqueous ammoniacal solution, or a salt of magnesium, added for instance in aqueous solution along with an ammonium salt, or an ammonium salt which, reacting in situ upon the magnesium oxide added to the dispersion, gives rise to the formation of a soluble salt of magnesium possessing strong coagulating action towards the rubber dispersion. By this means, it is invariably possible to produce a thoroughly tough coagulum.

The rubber dispersion may, if desired, contain vulcanizing ingredients, dyes, pigments or other colouring matter or any of the fillers usually employed in the rubber art.

In the case of manufacture of vulcanized rubber, the vulcanization step may be carried out by any usual method in the art, and may be preceded or followed or both preceded and followed by a washing of the product with water, followed by a drying of the washed article.

The pronounced mechanical properties characterizing the rubber composition produced in accordance with this invention are fully obtained only after the product has been completely dried. Care should be taken, therefore, to ensure complete drying.

The resulting dried product possesses a higher weight than that corresponding to the weight of parent dispersion employed, taking into account of course the additions of fillers, vulcanizing agents and the like, the increase in weight being due to the formation of the hydroxide of the magnesium oxide addition. The molecular weight of magnesium hydroxide (Mg(OH)$_2$) is 58.3 and that of magnesium oxide (MgO) is 40.3.

The rubber dispersion containing the added magnesium oxide may be used, while still in fluid condition, for water-proofing fabrics and also for manufacturing rubber articles by any of the direct manufacturing processes, including, for example, dipping, moulding, spreading and spraying, care being taken, if heated moulds are employed or if otherwise heat is used in the process, to avoid complete drying of the article until after hydration of the magnesium oxide introduced into the dispersion is complete.

Alternatively, the coagulated rubber obtained from the dispersion after hydration of the magnesium oxide therein and after complete or partial drying, may be employed in processes of indirect manufacture of rubber goods from coagulated rubber mixings.

In order to illustrate the invention, the following examples are given, but it is to be understood that the invention is not limited in any way to the precise details described in these examples, which are given purely by way of guidance.

Example I

A rubber dispersion composed of:—

| | Grams |
|---|---|
| Concentrated latex having 60% dry rubber content | 500 |
| Zinc oxide | 5 |
| Accelerator | 5 |
| Sulphur | 10 |
| Magnesium oxide | 75 | is prepared by adding to the latex the vulcanizing ingredients and zinc oxide suspended in a few ccs. of a 5% aqueous solution of glue, and then adding a freshly prepared suspension of magnesium oxide in 200 ccs. of a 2% solution of sodium cetylsulphonate. The resulting mixed dispersion, which at first remains fairly fluid, commences to thicken and continues to do so until coagulation becomes complete, after about 2 hours. Thereafter, the dispersion is permitted to remain at room temperature for about 14 or 15 hours. It may then be vulcanized by immersion in a water bath for a period of one hour at a temperature of 100° C.

The vulcanized product, which while still wet is hard, but little elastic, becomes highly tenacious upon drying.

Example II

A rubber dispersion composed of:—

| | Grams |
|---|---|
| Latex having 60% dry rubber content | 500 |
| Accelerator | 5 |
| Sulphur | 10 |
| Crystallized zinc sulphate | 17.5 |
| Magnesium oxide | 50 | is prepared by adding to the concentrated latex (a) the vulcanizing ingredients suspended in a few ccs. of a 5% solution of glue, (b) the zinc sulphate component dissolved in water, concentrated ammonia having been added to the solution of zinc sulphate until the zinc hydroxide first precipitated is dissolved again, and (c) the magnesium oxide component freshly suspended in 35 ccs. of a 2% solution of sodium acetyl sulphate. The resulting fluid dispersion which at room temperature would gel in about ½ hour, is left for two hours at 175° C. The resulting tough and hard coagulum obtained is then washed for two hours with water and may afterwards be vulcanized in an oven for one hour at 100° C. and then dried.

The product prepared in accordance with Example I above is slightly opaque owing to the presence of zinc oxide. That prepared according to Example II is fairly translucent.

What I claim and desire to secure by Letters Patent of the United States is:—

1. A process for the direct manufacture from aqueous rubber dispersions of rubber compositions and goods, which consists in adding a hydratable magnesium oxide in quantity sufficient to toughen the rubber, coagulating the dispersion before the hydration of the oxide therein is complete, and allowing the wet coagulum to stand for a sufficient period of time to effect complete hydration of the oxide and drying the coagulum.

2. A process for the direct manufacture from aqueous rubber dispersions of rubber compositions and goods, which consists in adding to the dispersion a hydratable magnesium oxide in quantity sufficient to toughen the rubber, coagulating the dispersion before hydration of the oxide therein is complete, allowing the wet coagulum to stand for at least two hours to effect complete hydration of the oxide and drying the coagulum.

3. A process for the direct manufacture from aqueous rubber dispersions of rubber compositions and goods, which consists in adding to the dispersion a hydratable magnesium oxide in quantity sufficient to toughen the rubber, coagulating the dispersion with the aid of heat before hydration of the oxide therein is complete, allowing the wet coagulum to stand for at least two hours to effect complete hydration of the oxide and drying the coagulum.

4. A process for the direct manufacture from aqueous rubber dispersions of rubber compositions and goods, which consists in adding to the dispersion a hydratable magnesium oxide in quantity sufficient to toughen the rubber, coagulating the dispersion before hydration of the oxide therein is complete, allowing the wet coagulum to stand with application of heat to it for at least two hours to effect complete hydration of the oxide and drying the coagulum.

5. A process for the direct manufacture from aqueous rubber dispersions of rubber compositions and goods, which consists in adding to the dispersion a hydratable magnesium oxide in quantity sufficient to toughen the rubber, coagulating the dispersion with the aid of heat before hydration of the oxide therein is complete, allowing the wet coagulum to stand with application of heat to it for at least two hours to effect complete hydration of the oxide and drying the coagulum.

6. A process for the direct manufacture from aqueous rubber dispersions of rubber compositions and goods, which consists in adding to the dispersion a hydratable magnesium oxide in quantity sufficient to toughen the rubber and not less than 15% reckoned by weight upon the rubber content of the dispersion, coagulating the dispersion before hydration of the oxide therein is complete, allowing the wet coagulum to stand for at least two hours to effect complete hydration of the oxide and drying the coagulum.

7. A process for the direct manufacture from aqueous rubber dispersions of rubber compositions and goods, which consists in adding to the dispersion a hydratable magnesium oxide in quantity sufficient to toughen the rubber and not less than 15% reckoned by weight upon the rubber content of the dispersion, coagulating the dispersion with the aid of heat before hydration of the oxide therein is complete, allowing the wet coagulum to stand for at least two hours to effect complete hydration of the oxide and drying the coagulum.

8. A process for the direct manufacture from aqueous rubber dispersions of rubber compositions and goods, which consists in adding to the dispersion a hydratable magnesium oxide in quantity sufficient to toughen the rubber and not less than 15% reckoned by weight upon the rubber content of the dispersion, coagulating the dispersion before hydration of the oxide therein is complete, allowing the wet coagulum to stand with application of heat to it for a least two hours to effect complete hydration of the oxide and drying the coagulum.

9. A process for the direct manufacture from aqueous rubber dispersions of rubber compositions and goods, which consists in adding to the dispersion a hydratable magnesium oxide in quantity sufficient to toughen the rubber and not less than 15% reckoned by weight upon the rubber content of the dispersion, coagulating the dispersion with the aid of heat before hydration of the oxide therein is complete, allowing the wet coagulum to stand with application of heat to it for at least two hours to effect complete hydration of the oxide and drying the coagulum.

10. A process for the direct manufacture from aqueous rubber dispersions of rubber compositions and goods, which consists in adding to the dispersion in the form of a fine suspension in water containing a dispersing agent a hydratable magnesium oxide in quantity sufficient to toughen the rubber, coagulating the dispersion before hydration of the oxide therein is complete, allowing the wet coagulum to stand for at least two hours to effect complete hydration of the oxide and drying the coagulum.

11. A process for the direct manufacture from aqueous rubber dispersions of rubber compositions and goods, which consists in adding to the dispersion in the form of a fine suspension in water containing an alkali metal salt of a sulphonated fatty acid as a dispersing agent a hydratable magnesium oxide in quantity sufficient to toughen the rubber, coagulating the dispersion before hydration of the oxide therein is complete, allowing the wet coagulum to stand for at least two hours to effect complete hydration of the oxide and drying the coagulum.

12. Rubber compositions and goods manufactured in accordance with the process set forth in claim 1.

UGO PESTALOZZA.